United States Patent
Wyant et al.

(10) Patent No.: US 7,788,840 B2
(45) Date of Patent: Sep. 7, 2010

(54) APPARATUS FOR REVOLVING DECOYS ABOUT A VERTICAL AXIS

(75) Inventors: Richard A. Wyant, Red Hook, NY (US); Gaetano Magarelli, Elizaville, NY (US)

(73) Assignee: Countrymen Innovations LLC, Red Hook, NY (US)

( * ) Notice: Subject to any disclaimer, the term of this patent is extended or adjusted under 35 U.S.C. 154(b) by 0 days.

(21) Appl. No.: 12/405,379

(22) Filed: Mar. 17, 2009

(65) Prior Publication Data
US 2009/0235571 A1 Sep. 24, 2009

Related U.S. Application Data

(60) Provisional application No. 61/038,051, filed on Mar. 20, 2008.

(51) Int. Cl.
*A01M 31/06* (2006.01)
(52) U.S. Cl. .................................. 43/3; 43/2
(58) Field of Classification Search .............. 43/2, 43/3, 26.1
See application file for complete search history.

(56) References Cited

U.S. PATENT DOCUMENTS

| | | | | |
|---|---|---|---|---|
| 1,376,282 A * | 4/1921 | Kauffman | 43/2 |
| 2,726,469 A * | 12/1955 | Becker | 43/3 |
| 3,762,702 A * | 10/1973 | Keele et al. | 472/10 |
| 4,422,257 A * | 12/1983 | McCrory | 43/3 |
| 4,535,560 A * | 8/1985 | O'Neil | 43/3 |
| 4,910,905 A * | 3/1990 | Girdley et al. | 43/3 |
| 5,956,880 A * | 9/1999 | Sugimoto | 43/2 |
| 6,079,140 A * | 6/2000 | Brock, IV | 43/3 |
| 6,430,863 B1 * | 8/2002 | Krag | 43/3 |
| 6,442,885 B1 * | 9/2002 | Payne | 43/3 |
| 6,834,458 B1 * | 12/2004 | Hand et al. | 43/3 |
| 6,907,688 B2 * | 6/2005 | Brint | 43/2 |
| 6,957,509 B2 * | 10/2005 | Wright | 43/3 |
| 7,043,865 B1 * | 5/2006 | Crowe | 43/3 |
| 7,137,221 B2 | 11/2006 | Highby et al. | |
| 7,536,823 B2 * | 5/2009 | Brint | 43/2 |
| 2005/0150149 A1 * | 7/2005 | Highby et al. | 43/3 |
| 2008/0092427 A1 | 4/2008 | Brint | |

* cited by examiner

*Primary Examiner*—David J Parsley
(74) *Attorney, Agent, or Firm*—Law Office of Michael L. Wise, LLC

(57) ABSTRACT

An apparatus comprises a motor, a traverse support beam, a first support rod, and a second support rod. The motor is operative to rotate an axle. The traverse support beam is rotationally coupled to this axle and has a first end and a second end. The first support rod is coupled to the first end of the traverse support beam and is adapted to support a first decoy. Finally, the second support rod is coupled to the second end of the traverse support beam and is adapted to support a second decoy.

16 Claims, 4 Drawing Sheets

APPARATUS FOR REVOLVING DECOYS ABOUT A VERTICAL AXIS

CROSS REFERENCES TO RELATED APPLICATIONS

This application claims the benefit of U.S. Provisional Application No. 61/038,051, filed Mar. 20, 2008.

FIELD OF THE INVENTION

This invention relates generally to decoys, and, more particularly, to apparatus for providing motion to decoys in order to more effectively attract game animals.

BACKGROUND OF THE INVENTION

Decoys are widely manufactured and sold for the purpose of attracting wild animals for gaming and observation. "Gaming" includes such activities as hunting, and "observation" includes such activities as photography.

It has been empirically observed that some game animals are more attracted to decoys having movement than they are to decoys that remain still. For this reason, there is a need for apparatus that provide motion to conventional decoys in a manner that helps to attract wild animals.

SUMMARY OF THE INVENTION

Embodiments of the present invention address the above-identified need by setting forth apparatus for providing motion to decoys.

In accordance with an aspect of the invention, an apparatus comprises a motor, a traverse support beam, a first support rod, and a second support rod. The motor is operative to rotate an axle. The traverse support beam is rotationally coupled to this axle and has a first end and a second end. The first support rod is coupled to the first end of the traverse support beam and is adapted to support a first decoy. Finally, the second support rod is coupled to the second end of the traverse support beam and is adapted to support a second decoy.

In accordance with another aspect of the invention, an apparatus comprises a motor, a traverse support beam, a first support rod, a first decoy, a second support rod, and a second decoy. The motor is operative to rotate an axle. The traverse support beam is rotationally coupled to this axle and has a first end and a second end. The first support rod is coupled to the first end of the traverse support rod. The first decoy is supported by the first support rod. Likewise, the second support rod is coupled to the second end of the traverse support beam. The second decoy is supported by the second support rod.

In accordance with one of the above-identified embodiments of the invention, an apparatus is operative to rotate two decoys about a central vertical axis by having a motor rotate a traverse support beam that sits horizontally with respect to the ground. The decoys are supported by respective support rods that are mounted vertically on the ends of this traverse support beam. In addition to being rotated about the central vertical axis, the decoys have the ability to freely rotate to a limited extent about their support rods.

Advantageously, embodiments of the invention are very effective in attracting wild animals for gaming and observation at least in part due to the specialized rotational motion that they provide to decoys.

These and other features and advantages of the present invention will become apparent from the following detailed description which is to be read in conjunction with the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
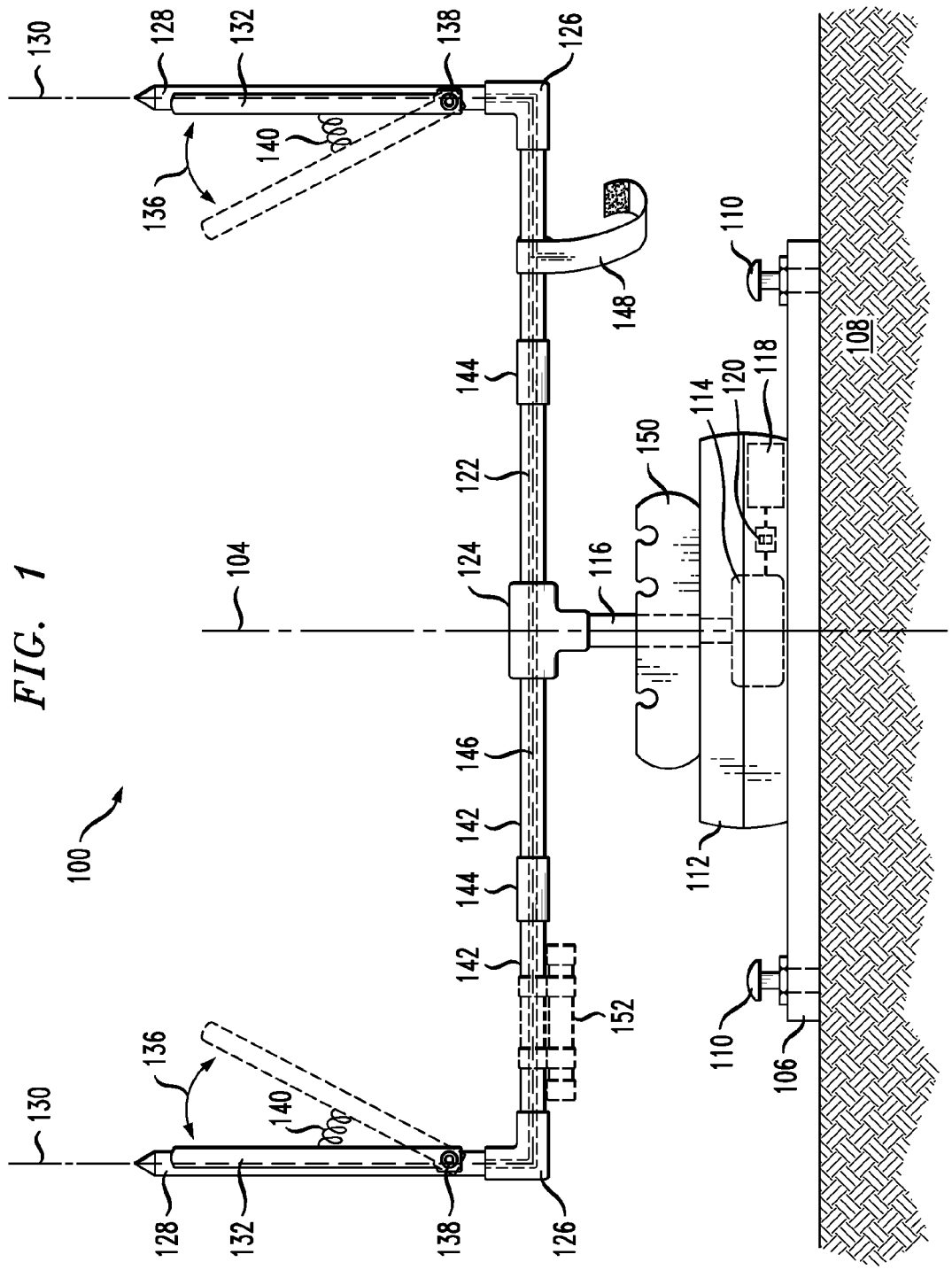
FIG. 1 shows a longitudinal cross-sectional view of an apparatus in accordance with an illustrative embodiment of the invention.
Figure 2:
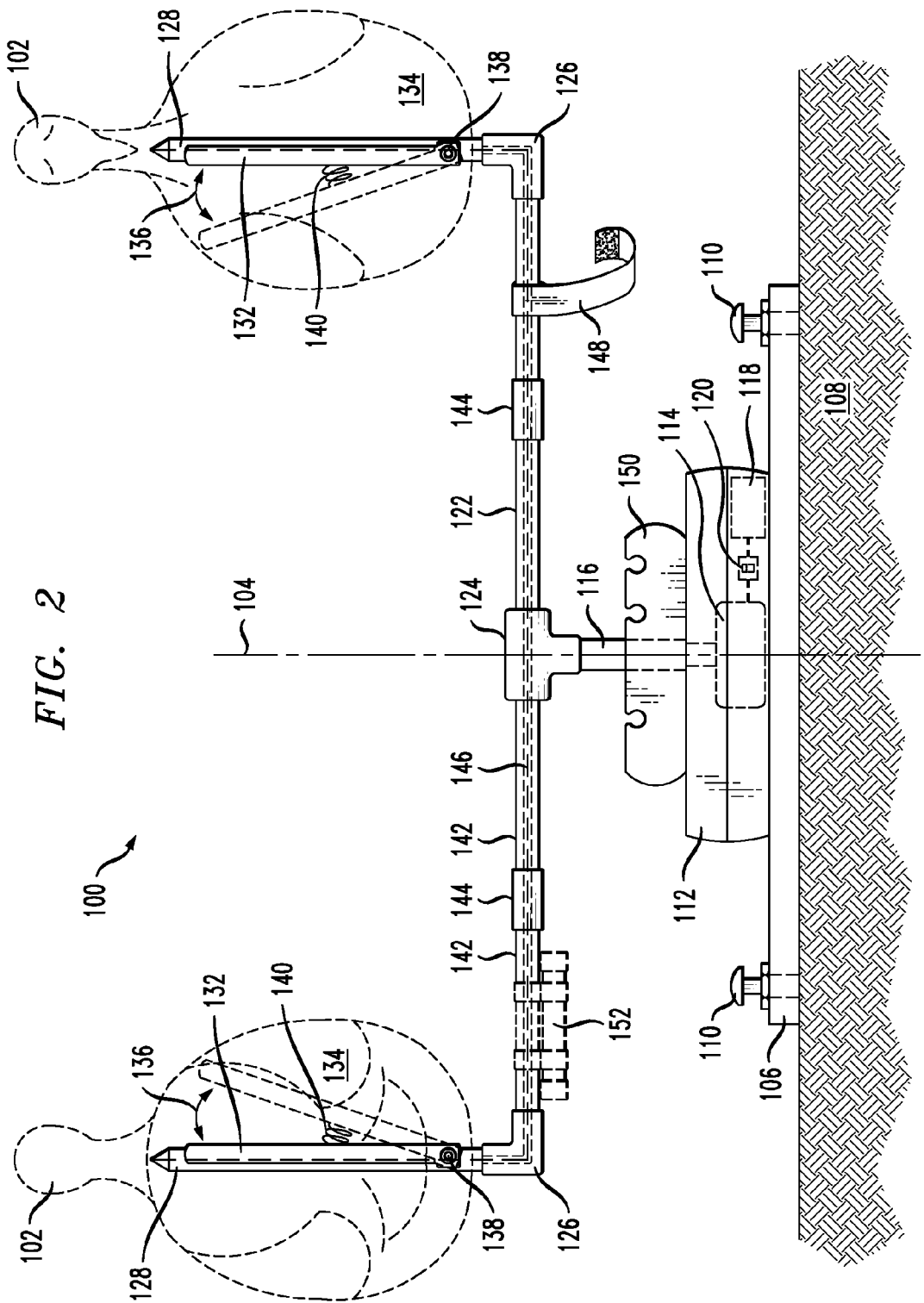
FIG. 2 shows the FIG. 1 cross-sectional view with the addition of decoys.
Figure 3:
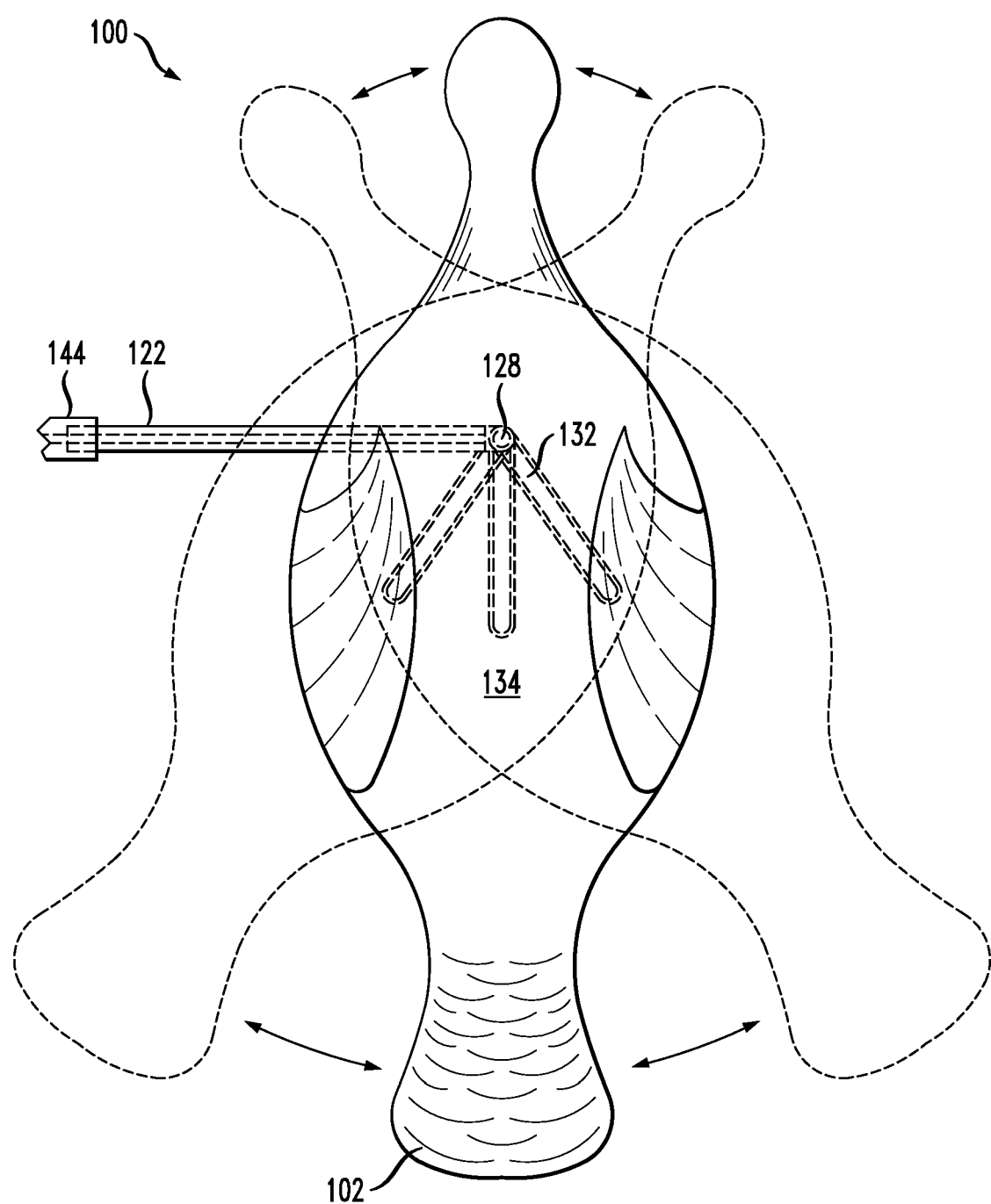
FIG. 3 shows a top plan view of the FIG. 2 apparatus and decoy.

FIGS. 1-3 show an apparatus 100 for revolving two decoys 102 about a central vertical axis 104. FIG. 1 depicts a longitudinal cross-sectional view of the apparatus. The apparatus includes a base 106 that can be anchored to the ground 108 by a plurality of anchoring pins 110 (e.g., spikes or nails). The base, in turn, supports a motor housing 112 that contains a motor 114 that is operative to turn an axle 116. The motor is powered by a battery 118 and is controlled by a switch 120. The axle couples to a traverse support beam 122 above the motor through a central union 124. At each end of the traverse support beam, an elbow union 126 couples the traverse support beam to a respective support rod 128.

Various motions are mechanically allowed and restricted while the apparatus 100 is in operation. The motor 114 rotates (or swings) the traverse support beam 122 about the central vertical axis 104 by rotating the axle 116. The rotation of the axle is coupled to the central union 124 by having the top of the axle terminate in a noncircular nib that fits into an inversely shaped slot in the bottom of the central union. In this manner, the axle and traverse support beam are rotationally coupled.

The support rods 128 at the ends of the traverse support beam 122 are not allowed to rotate relative to the traverse support beam. Instead, these support rods comprise their own noncircular nibs that fit into inversely shaped slots in the elbow unions 126.

Finally, the decoys 102 are allowed some limited ability to independently rotate (i.e., pivot) about the long vertical axes 130 defined by their respective support rods 128. This rotational movement is hereafter called "decoy rotation." As further shown in FIG. 1, the support rods each are attached to a respective limiting arm 132 which extends outward at an angle 136 from the support rod. It is these limiting arms which ultimately control decoy rotation, as further detailed next.

FIG. 2 shows a cross-sectional view similar to FIG. 1, but with the inclusion of the two decoys 102. FIG. 3, moreover, shows a top down view of one of the decoys and its underlying support rod 128, limiting arm 132, and the traverse support beam 122. It can be seen in these figures that each decoy comprises a hollow region 134 which is slipped over the support rods and the limiting arms when the decoys are mounted on the apparatus 100. These limiting arms, in turn, contact the inside bodies of the decoys at certain extremes of decoy rotation (see FIG. 3). This contact limits any further decoy rotation motion beyond these extremes, while leaving the decoys able to freely rotate between the extremes.

In FIG. 3, for example, decoy rotation is limited such that the shown decoy 102 is only allowed to freely rotate by about 30 degrees in each direction with respect to the long vertical axis 130 defined by its support rod 128. Nevertheless, this configuration is simply illustrative. The extent of decoy rotation for a given decoy can be adjusted by simply changing the angle 136 by which its respective limiting arm 132 extends from its respective support rod. Increasing the angle typically reduces the allowed decoy rotation motion while reducing the angle has the opposite effect.

In the particular embodiment of the apparatus 100 shown in FIGS. 1-3, the limiting arms 132 are attached to their support rods 128 by having the limiting arms rotate on pins 138 that pass through the support rods. The limiting arms are, in turn, pushed outward from the support rods by springs 140. However, several other means of attachment may also be utilized including shaping the limiting arms with concave portions that snap around the support rods or using hinges.

Figure 4:
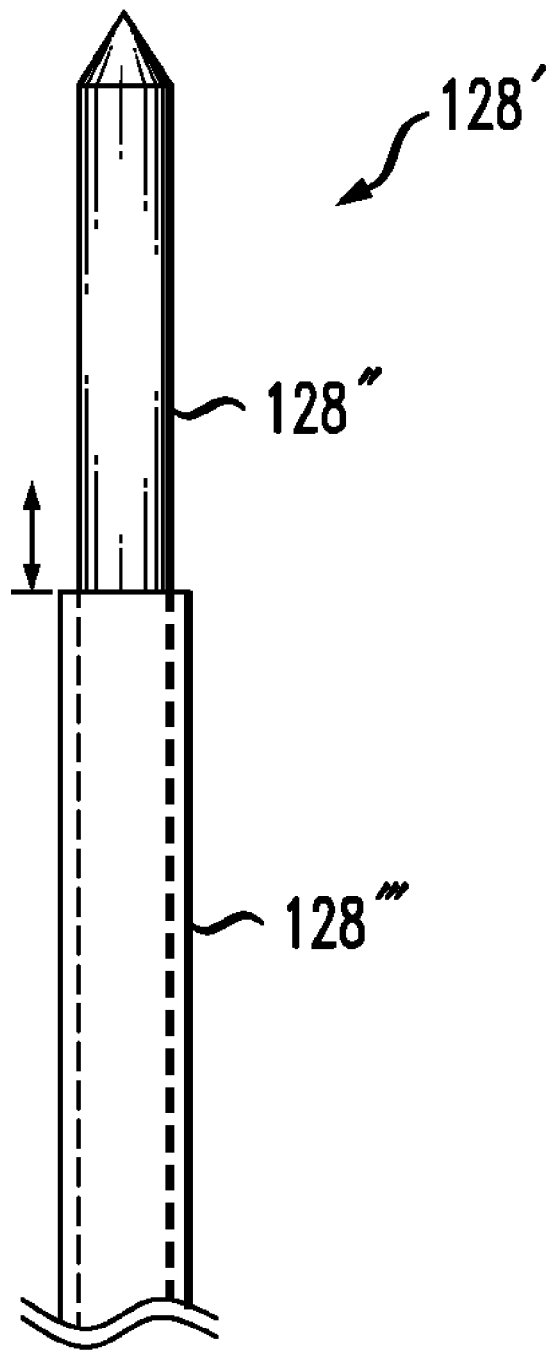
FIG. 4 shows a top perspective view of an exemplary telescoping support rod for use in the FIG. 1 apparatus.

Moreover the support rods 128 may be made to be telescopically adjustable in length (i.e., height) in order to accommodate decoys 102 of differing shapes and sizes. This can be accomplished by, for example, forming the support rods of two or more slidably overlapping rod subsections. FIG. 4 shows an exemplary telescoping support rod 128' with slidably overlapping rod subsections 128" and 128"'.

The motion of the apparatus 100 can be modified by making changes to the motor 114. Modifying the motor's gearing and/or drive circuitry, for example, allows the apparatus to periodically and autonomously start and stop rotating the axle 116 (and the traverse support beam 122) while the apparatus is in operation. Such intermittent pausing has been found to be very effective in attracting game. In one embodiment, for example, the pause time might be about one half of the rotation time. One skilled in the art will recognize how to design this functionality into a motor.

Optionally, the speed, direction, and/or pausing of the motor 114 may be controlled by a remote control. The remote control could communicate with the motor controller via, for example, signals passed through a wire, infrared signals, or radio signals.

Making the apparatus 100 more compact for transport and storage is made easier by various features. As further shown in FIGS. 1 and 2, the traverse support beam 122 is made up of several beam members 142 and connecting unions 144 so that the traverse support beam may be disassembled by removing one end of each beam member from one of the connecting unions. The axle 116 of the motor 114 may also be removed from the central union 104 of the traverse support beam, so that the traverse support beam and support rods 128 may be disconnected from the motor housing 112.

In addition, an elastic string 146 is spanned between the support rods 128 through a channel in the traverse support beam 122. This elastic string provides a connection between the support rods, the various beam members 142, the connecting unions 144, the central union 124, and the elbow unions 126 so that these various components remain interconnected when they are disassembled from one another. A strap 148 is also available to wrap around these various components. The strap may have Velcro® ends for securing the strap around the components.

Finally, the anchoring pins 110 may be stored in holding slots on an anchoring pin rack 150 disposed on the motor housing 112.

For stability, the base 106 substantially describes a triangle when considered top-down, although other shapes (e.g., square, rectangle, and circle) may be equally advantageous. If it is desired that the apparatus 100 operate with only a single decoy 102 (rather than two decoys), a counterweight 152 may optionally be added to the apparatus to facilitate the balance of the apparatus while in motion. The apparatus may comprise various combinations of solid and hollow moldable plastics such as, but not limited to, polyvinylchloride (PVC), high or low density polypropylene, high or low density polyethylene, polystyrene, silicone rubber, silicone elastomer, organic elastomer, viton, sanoprene, and ethylene propylene diene monomer (EPDM).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

Moreover, all the features disclosed herein may be replaced by alternative features serving the same, equivalent, or similar purpose, unless expressly stated otherwise. Thus, unless expressly stated otherwise, each features disclosed is one example only of a generic series of equivalent or similar features.

What is claimed is:

1. An apparatus comprising:
   a base adapted to be fixedly disposed on a surface;
   a motor supported by the base, the motor operative to rotate an axle;
   a traverse support beam rotationally coupled to the axle, the traverse support beam having a first end and a second end;
   a first support rod coupled to the first end of the traverse support beam, the first support rod adapted to support a first decoy above the surface while extending through a substantial portion of the first decoy such that the first decoy is free to independently pivot about a lengthwise axis of the first support rod;
   a first support arm extending outward from the first support rod, the first support arm adapted to limit the pivoting of the first decoy between two respective extremes of rotation relative to the lengthwise axis of the first support rod when the first decoy is supported by the first support rod;
   a second support rod coupled to the second end of the traverse support beam, the second support rod adapted to support a second decoy above the surface while extending through a substantial portion of the second decoy such that the second decoy is free to independently pivot about a lengthwise axis of the second support rod; and
   a second support arm extending outward from the second support rod, the second support arm adapted to limit the pivoting of the second decoy between two respective extremes of rotation relative to the lengthwise axis of the second support rod when the second decoy is supported by the second support rod.

2. The apparatus of claim 1, wherein the apparatus is operative to rotate the first support rod and the second support rod about an axis of rotation of the axle.

3. The apparatus of claim 1, wherein the apparatus is adapted to hold the first support rod substantially orthogonal to the traverse support beam.

4. The apparatus of claim 1, wherein the apparatus further comprises a string, the string connecting the first support rod to the second support rod.

5. The apparatus of claim 4, wherein the string is substantially elastic.

6. The apparatus of claim 4, wherein the string runs at least partially through the traverse support beam.

7. The apparatus of claim 1, wherein the traverse support beam comprises two separate elements connected by a connecting union.

8. The apparatus of claim 1, wherein the first support rod is telescopically adjustable.

9. The apparatus of claim 1, wherein the base is adapted to be fixedly disposed on the surface using spikes or nails.

10. The apparatus of claim 1, wherein the apparatus is operative to periodically and autonomously start and stop rotating the axle.

11. The apparatus of claim 1, wherein the apparatus is operative to periodically start and stop rotating the axle in response to a signal from a remote control.

12. An apparatus comprising:
a base adapted to be fixedly disposed on a surface;
a motor supported by the base, the motor operative to rotate an axle;
a traverse support beam rotationally coupled to the axle, the traverse support beam having a first end and a second end;
a first support rod coupled to the first end of the traverse support beam, the first support rod supporting a first decoy above the surface while extending through a substantial portion of the first decoy such that the first decoy is free to independently pivot about a lengthwise axis of the first support rod;
a first support arm extending outward from the first support rod, the first support arm adapted to limit the pivoting of the first decoy between two respective extremes of rotation relative to the lengthwise axis of the first support rod;
a second support rod coupled to the second end of the traverse support beam, the second support rod supporting a second decoy above the surface while extending through a substantial portion of the second decoy such that the second decoy is free to independently pivot about a lengthwise axis of the second support rod; and
a second support arm extending outward from the second support rod, the second support arm adapted to limit the pivoting of the second decoy between two respective extremes of rotation relative to the lengthwise axis of the second support rod.

13. The apparatus of claim 12, wherein the first decoy defines a hollow cavity therein.

14. The apparatus of claim 12, wherein the first support arm is adapted to contact an inside portion of the first decoy when the first decoy is in a given alignment relative to the first support rod.

15. The apparatus of claim 12, wherein the first decoy depicts a bird.

16. The apparatus of claim 12, wherein the first decoy depicts a turkey, grouse, quail, or pheasant.

* * * * *